July 19, 1949.　　　M. LEEUWIN ET AL　　　2,476,881
MEASURING DEVICE COMPRISING A VARIABLE POTENTIOMETER
Filed April 24, 1946
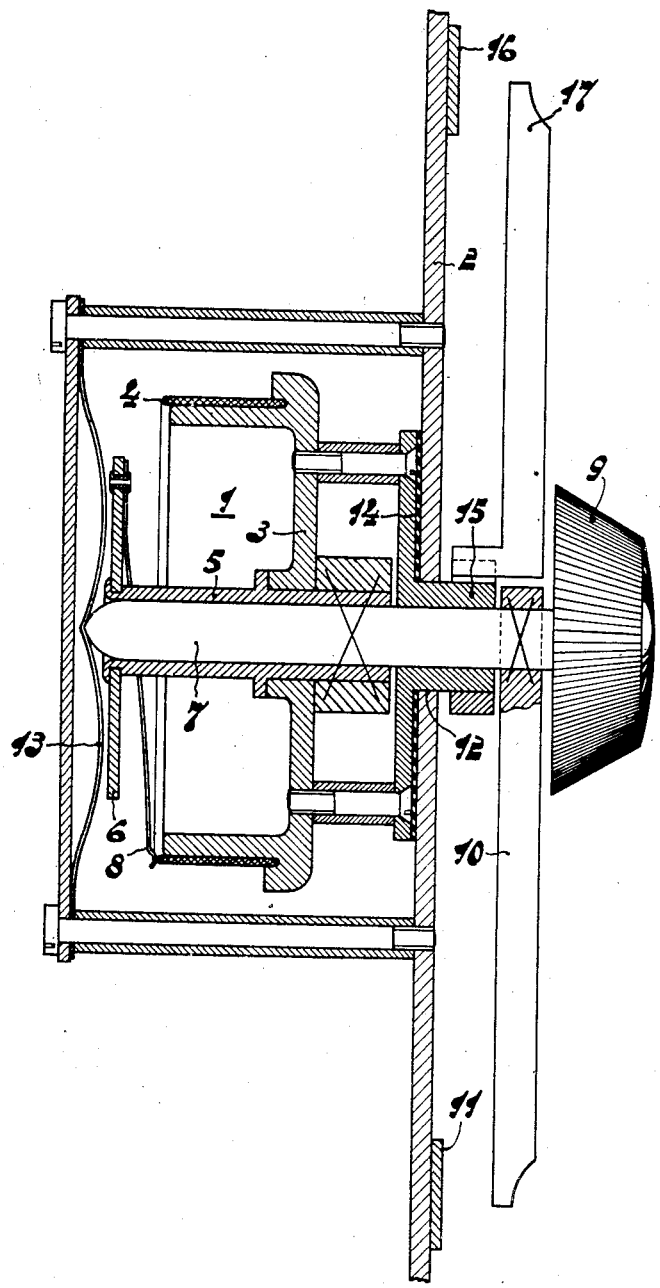
INVENTORS
MAX LEEUWIN &
MAX LOPEZ CARDOZO
BY
ATTORNEY Patented July 19, 1949

2,476,881

UNITED STATES PATENT OFFICE 2,476,881

MEASURING DEVICE COMPRISING A VARIABLE POTENTIOMETER

Max Leeuwin and Max Lopez Cardozo, Eindhoven, Netherlands, assignors, by mesne assignments, to Hartford National Bank and Trust Company, Hartford, Conn., as trustee Application April 24, 1946, Serial No. 664,496
In the Netherlands October 29, 1942

Section 1, Public Law 690, August 8, 1946
Patent expires October 29, 1962

6 Claims. (Cl. 201—55)

This invention relates to a measuring device in which a variable resistance equipped with a calibrated scale serves as an indicating instrument. Such measuring devices may, for instance, be used in making pH-measurements according to the potentiometer method, in making impedance measurements, more particularly resistance measurements on liquids or gases or for the quantitative examination of the optical properties of solid materials, liquids or gases demonstrated by brightness differences.

With such measuring devices means should be used which permit the calibration curve of the measuring device to be shifted parallel with itself, either in view of a desired correction of the zero point or for taking into account a correction factor having the same or substantially the same value for the whole measuring range of the device.

Such a parallel displacement of the calibration curve of the device is desirable, for instance in pH-measurements, in view of the use of different measuring electrodes (such as glass-, hydrogen-, chinhydron or calomel electrodes) or in other cases for taking into account correction values related with temperature or other external conditions.

The present invention has for its object to provide an extremely simple and advantageous method of displacing parallel with itself the calibration curve of a measuring device comprising a variable potentiometer which serves as an indicating instrument and is equipped with a calibrated scale for reading the position of the collection contact which is movable with respect to the resistance path.

In such a measuring device, according to the invention, the scale is stationary and the resistance path is rotary, a stopping mechanism capable of being thrown out preventing rotation of the resistance path.

When using a resistance path incorporated in the potentiometer housing the stopping mechanism is preferably realized in such manner as to be thrown out upon a displacement of the potentiometer housing in an axial direction.

In this case an extremely simple control of the device according to the invention is secured by realizing the potentiometer in such manner that upon a displacement of the collection contact shaft in an axial direction the potentiometer housing is carried along upon a rotation of the contact shaft.

When making use of the invention a potentiometer of the usual type having a cylindrical housing may be used, which is so arranged as to be rotatable and, if desired, movable in an axial direction. In contradistinction to another expedient known per se for the parallel displacement of the calibration curve in measuring devices equipped with a pointer instrument, i. e., a displacement of the scale in the direction of indication, the use of the invention offers the additional advantage of no additional space being required for the scale, whilst the appearance of the measuring device is not affected.

The expedient according to the invention is also advantageous as compared with a further possibility existing, in principle, for attaining the same purpose, i. e. interruption of the collection contact shaft and movable arrangement of the axis parts thus obtained, since in this case a simple indication about the mutual rotation of the parts of the axis and the provision of an easily controllable stopping mechanism involves practical difficulties.

The invention will now be more fully explained by reference to the accompanying drawing representing, by way of example, a cross-section of a variable potentiometer equipped with a calibrated scale for use in a measuring device according to the invention.

In the sole figure the reference number 1 designates a variable potentiometer having a common construction which is secured to a mounting plate 2, for instance the front plate of the measuring device and furnished with a resistance path 4 inside an open housing 3, on which is movable, by operating a control knob 9, a contact arm 8 which is secured to an axis 7 by means of a bush 5 and a disc 6. The position of the collection contact 8 relatively to the resistance path 4 can be read by means of a pointer 10 which is keyed to the shaft 7 and passes along the scale 11 provided on the front plate.

For parallel displacement of the calibration curve of the measuring device the potentiometer housing is movable in a circular slot 12 of the front plate 2. However, a spring 13 acting in an axial direction immobilizes the housing of the potentiometer, since this spring presses a friction plate 14, secured to the housing, against the back of the front plate 2, which, in a suitable construction, brings about sufficient friction for preventing rotation of the housing 3.

When depressing the control knob 9 the shaft 7 is displaced against the action of the spring 13 and carries along the housing 3, as a result of which the friction plate 14 is lifted from the back of the front plate and the stopping mechanism is disengaged. Upon subsequent rotation of the control knob 9, while it remains depressed, the housing of the potentiometer is capable of following this rotation owing to the friction occurring between the collection contact 6 and the resistance path 4. For indicating the rotation of the housing 3 thus brought about a journal bush 15 secured to the friction plate 14 is slipped through the front plate, and a pointer 17 moving in front of the scale 16 is secured to the free end of the said bush.

After adjustment of the desired rotation of the housing the latter is immobilized by removing the pressure exerted on the knob 9 in an axial direction.

What we claim is:

1. A measuring device comprising a variable potentiometer having a resistance path, a collection contact movable along said resistance path, a stationary calibrated scale operatively associated with said movable collection contact for permitting a reading of the position of said collection contact, and means for normally holding said resistance path stationary in relation to said stationary calibrated scale and optionally operative to permit movement of said resistance path in relation to said stationary calibrated scale, the means for normally holding said resistance path stationary in relation to said stationary calibrated scale being optionally operative to permit movement of said resistance path in relation to said stationary calibration scale by axial movement of said variable potentiometer.

2. A measuring device comprising a variable potentiometer having a resistance path, a collection contact movable along said resistance path, a stationary calibrated scale operatively associated with said movable collection contact for permitting a reading of the position of said collection contact, means for normally holding said resistance path stationary in relation to said stationary calibrated scale and optionally operative to permit movement of said resistance path in relation to said stationary calibrated scale, said collection contact being fixedly mounted upon a shaft for movement therewith said means for normally holding said resistance path stationary in relation to said stationary calibrated scale being optionally operative to permit movement of said resistance path in relation to said stationary calibration by axial movement of said variable potentiometer, and other means for moving said potentiometer in an axial direction upon movement of said shaft in an axial direction.

3. A measuring device comprising a variable potentiometer having a resistance path, a collection contact movable along said resistance path, a stationary calibrated scale operatively associated with said movable collection contact for permitting a reading of the position of said collection contact, means for normally holding said resistance path stationary in relation to said stationary calibrated scale and optionally operative to permit movement of said resistance path in relation to said scale, said collection contact being fixedly mounted on a shaft for movement therewith, said means for normally holding said resistance path stationary in relation to said stationary calibrated scale being optionally operative to permit movement of said resistance path in relation to said stationary calibration scale by axial movement of said variable potentiometer, other means for moving said potentiometer in an axial direction upon movement of said shaft in an axial direction, spring means to exert a force against such axial movement of said shaft and said potentiometer, and a friction surface secured to said potentiometer and located opposite a corresponding stationary surface whereby the action of the spring normally causes said friction surface to press against said stationary surface to so prevent movement therebetween.

4. A measuring device comprising a potentiometer having a circular resistance element, a support for said element, a rotatable shaft extending through said support and disposed along the axis of said element, a collection contact secured to said shaft for movement along said element, means normally urging said support into engagement with a stationary surface to maintain said support immovable, and means for effecting engagement between said support and said shaft upon an axial displacement of said shaft to enable rotation of said resistance element by said shaft.

5. A measuring device comprising a potentiometer having a circular resistance element, a support for said element, a rotatable shaft extending through said support and disposed along the axis of said element, a collection contact secured to said shaft for movement along said element, means normally urging said support into engagement with a stationary surface to maintain said support immovable, means for effecting engagement between said support and said shaft upon an axial displacement of said shaft to enable rotation of said resistance element by said shaft, a stationary calibrated scale, and a pointer keyed to said shaft and arranged in cooperative relation with said scale.

6. An arrangement, as set forth in claim 5, further including a second calibrated scale, and a second pointer secured to said support and disposed in cooperative relation with said second scale.

MAX LEEUWIN.
MAX LOPEZ CARDOZO.

REFERENCES CITED

The following references are of record in the file of this patent:

UNITED STATES PATENTS

| Number | Name | Date |
|---|---|---|
| 673,300 | Stadel et al. | Apr. 30, 1901 |
| 698,356 | Beals | Apr. 22, 1902 |
| 1,742,462 | Eisler | Jan. 7, 1930 |
| 1,783,542 | Merle | Dec. 2, 1930 |